United States Patent [19]

Stich

[11] 4,048,554
[45] Sept. 13, 1977

[54] VARIABLE FREQUENCY, VARIABLE VOLTAGE POWER SUPPLY

[75] Inventor: Frederick A. Stich, Milwaukee, Wis.

[73] Assignee: Allis-Chalmers Corporation, Milwaukee, Wis.

[21] Appl. No.: 744,131

[22] Filed: Nov. 22, 1976

[51] Int. Cl.$^2$ ............................................. H02M 7/00
[52] U.S. Cl. ..................................... 363/98; 318/227;
363/124; 363/132; 363/138
[58] Field of Search .................... 321/5, 19, 21, 45 C;
318/227

[56] References Cited
U.S. PATENT DOCUMENTS

| | | | |
|---|---|---|---|
| 3,403,318 | 9/1968 | Krauthamer et al. | 321/21 X |
| 3,611,108 | 10/1971 | Susumu et al. | 321/5 X |
| 3,848,176 | 11/1974 | Etter | 321/5 X |
| 3,855,520 | 12/1974 | Stich | 323/19 |
| 4,019,116 | 4/1977 | Klautschek | 318/227 X |

Primary Examiner—William M. Shoop
Attorney, Agent, or Firm—Lee H. Kaiser

[57] ABSTRACT

A static polyphase inverter for supplying variable frequency, variable magnitude voltage to a load such as a polyphase motor has a transistor chopper between a unidirectional power source and an inverter bridge having n phase legs each of which includes a load current carrying controlled rectifier in series with the emitter-collector path of a transistor switch and the junction therebetween connected a phase winding of the motor; time ratio controlling means including a constant frequency oscillator for modulating the chopper at the constant oscillator frequency and for regulating the width of pulses conducted by the chopper as a function of the magnitude of an analog command signal; means for selectively controlling the switching frequency of the load current carrying controlled rectifiers as a function of the magnitude of the analog command signal to establish the inverter fundamental output frequency; means for intermittently applying a bias source in opposite polarity to the anode-cathode path of the controlled rectifiers when the transistor chopper is off to commutate them when they are not carrying load current; and means for synchronizing the switching of the chopper to the modulation frequency so the chopper is reset at the beginning of each half cycle of modulation frequency.

51 Claims, 14 Drawing Figures

VARIABLE FREQUENCY, VARIABLE VOLTAGE POWER SUPPLY

This invention relates to static inverters for supplying variable frequency and variable magnitude voltage from a unidirectional source to a load such as an induction motor.

BACKGROUND OF THE INVENTION

Different types of variable frequency, variable voltage power supplies are known, but they all have singular inherent disadvantages, particularly in cost and in size. For example, the response to transients by variable voltage link inverters with phase controlled rectifiers and choppers is unsuitable for some applications and also such inverters require an expensive DC filter. Pulse width modulated (PWM) inverters of the SCR type have difficulty in maintaining acceptably low motor current ripple and necessitate reactive enegy storage and expensive commutation circuits. The SCR's of known PWM inverters must be of the high-speed, and thus expensive, type because they switch at carrier frequency. Further, known inverters of the SCR type having a voltage-controlling transistor chopper commutate the SCR's off while they are conducting load current and thus require large and expensive inductive and capacitive elements in the commutation circuits. The transistor switches coupled to the high voltage bus of PWM transistor inverters are very expensive because they require high power, continuous, isolated drive signals which make the interface circuits thereto costly.

OBJECTS OF THE INVENTION

It is an object of the invention to provide an improved variable voltage, variable frequency AC power supply which eliminates the above disadvantages of, and is cheaper in cost than, prior art devices. Another object is to provide such a variable voltage, variable frequency power supply which does not require an expensive DC filter or commutation circuit or expensive switch interface circuits and still has improved transient response and lower motor ripple than prior art apparatus. Still another object is to provide an improved PWM inverter having SCR'S for supplying multi-step wave forms made up of variable width carrier frequency pulses to a motor load and wherein the SCR's which at modulation frequency and may thus be of low-speed inexpensive type. A further object is to provide an improved inverter of the SCR type having a voltage-controlling transistor chopper and wherein the SCR's are commutated while the chopper is turned off and load current is not flowing through the SCR's, thereby eliminating large and expensive inductive and capacitve commutation elements. A further object is to provide an improved variable voltage, variable frequency powder supply which has a unique configuration of semiconductor switches in the inverter which permits the switches to be low in cost and inexpensively driven and to provide low impedance, free-wheeling, out-of-phase paths for reactive current that result in low motor ripple. Still another object is to provide such an improved variable frequency, variable voltage AC power supply for a polyphase motor load which has a sufficiently high constant carrier frequency for the motor to do the filtering.

SUMMARY OF THE INVENTION

A variable frequency, variable voltage power supply in accordance with the invention has a voltage controlling chopper transistor coupled in series with at least a first and a second load current carrying controlled rectifier respectively across the positive and negative terminals of a unidirectional power source, means for time ratio controlling the transistor chopper at carrier frequency, means for selectively controlling the switching frequency of the controlled rectifiers to establish the fundamental inverter output frequency, and commutation means for intermittently applying reverse bias to the controlled rectifiers to commutate them when the transistor chopper is off. The controlled rectifiers are switched at the relatively low modulation frequency so they may be of the low-speed, and thus inexpensive, type and are commutated when the chopper is turned off so the need for commutation controlled rectifiers and for large and expensive inductive and capacitive commutation elements is obviated. A preferred embodiment has n phase legs connected across the positive and negative polarities of the source at the output of the chopper with each phase leg comprising a controlled rectifier in series with the emitter-collector circuit of a transistor switch and the junction therebetween adapted to be connected to one phase of the load, such as the phase winding of an induction motor; time ratio controlling means including a constant frequency oscillator for modulating the chopper at the constant oscillator frequency and for regulating the width of pulses carried by the chopper as a function of the magnitude of an analog command signal, means for controlling the switching frequeny of the controlled rectifiers as a function of the analog command signal to establish the inverter fundamental output, or modulation, frequency; and means for intermittently applying a bias source in opposite polarity to the anode-cathode path of the controlled rectifiers, when the chopper transistor is off, to commutate the controlled rectifiers off when they are not conducting load current.

DESCRIPTION OF THE DRAWINGS

The above and other objects and advantages of the invention will be more readily apparent from the following detailed description when considered together with the accompanying drawing wherein.

DETAILED DESCRIPTION

Figure 1:
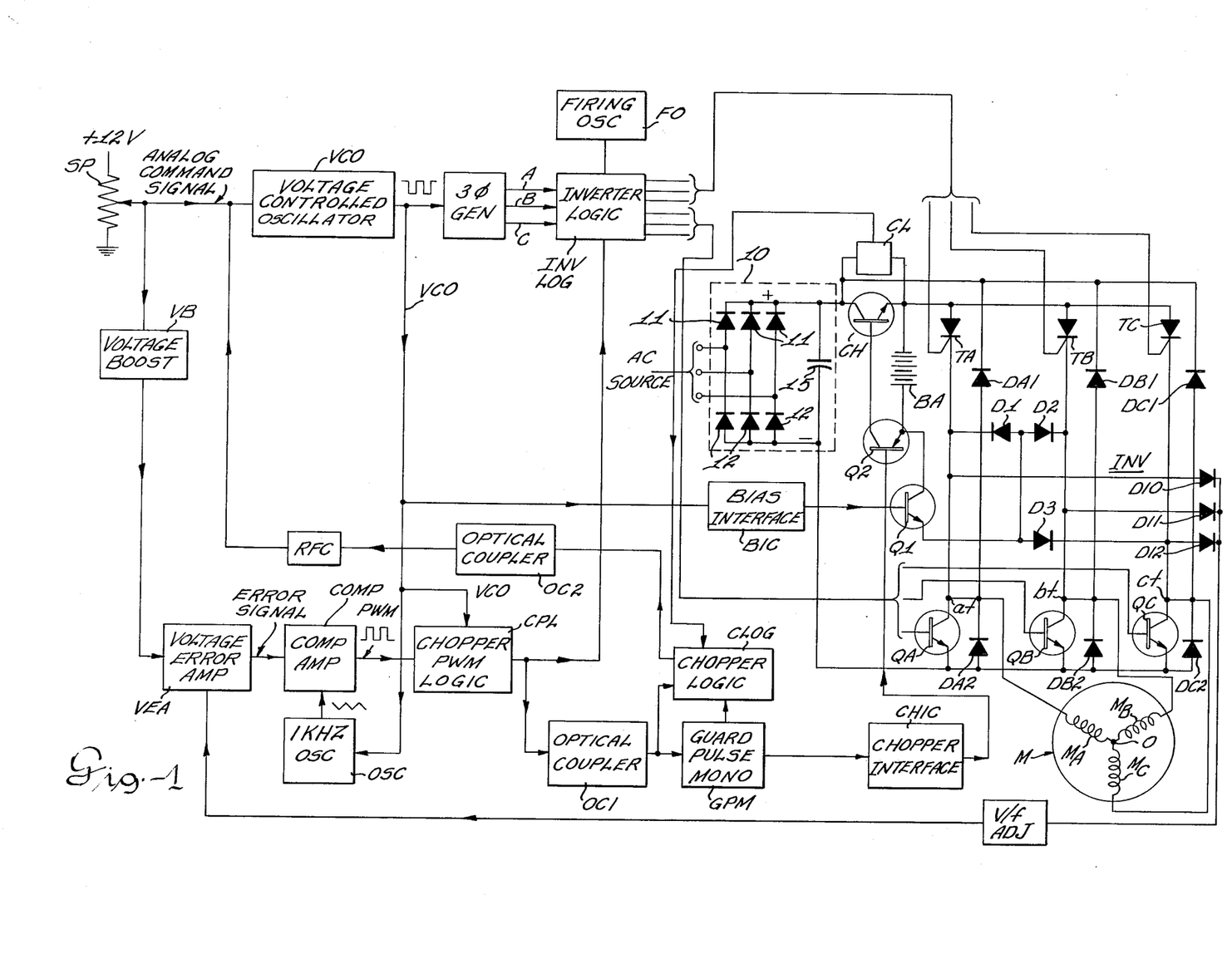
FIG. 1 is a schematic diagram of a preferred embodiment of the variable frequency, variable magnitude voltage supply of the invention with the control circuit shown in block form.

FIG. 1 is a schematic block diagram of a preferred embodiment of the invention adapted to provide variable frequency and variable voltage power from a unidirectional source 10 to a load such as an induction motor M to control motor speed over a wide range. Source 10 may supply 300 volt DC power through a voltage controlling transistor chopper CH to the inverter semiconductor switches and may in known manner comprise a three phase, full wave bridge rectifier having three diode rectifiers 11 with commoned cathodes connected to a positive bus + and three diode rectifiers 12 having commoned anodes connected to the negative bus − and a smoothing shunt capacitor 15. The inverter is shown as a series bridge INV which has three phase legs with a controlled rectifier, or SCR TA in the phase A leg having its anode coupled to the emitter of transistor chopper CH and in series with a transistor switch QA having its emitter coupled to the negative bus and the node therebetween consitituing the phase A output terminal at adapted to be connected to phase winding $M_A$ of motor M; a controlled rectifier TB in series with a transistor switch QB in the phase B leg and the node therebetween constituting the phase B output terminal bt adapted to be connected to motor phase winding $M_B$; and a controlled rectifier TC in series with a transistor switch QC in the phase C leg and the node therebetween constituting the phase C output terminal ct adapted to be connected to motor phase winding $M_C$. Feedback diodes DA1, DB1, DC1 may be connected in inverse polarity shunt relationship with SCR's TA, TB, TC respectively between the corresponding phase terminals at, bt, ct and the positive bus + at the input to chopper transistor CH, and feedback diodes DA2, DB2, DC2 may similarly be connected in inverse polarity shunt relation to transistor switches QA, QB, QC respectively. A separate voltage source BA for forward biasing chopper CH and for reverse biasing SCR's TA, TB, TC is shown in a battery BA and may have its negative terminal referenced to the output of chopper CH and its positive terminals coupled to the collector of a bias-applying transistor Q1 whose emitter is coupled through diodes D1, D2, D3 respectively to the corresponding phase output terminals, at, bt, ct. The positive terminal of source BA is also coupled to the emitter of a chopper driven transistor Q2.

SCR's TA, TB, TC are turned on sequentially by trains of gate pulses (See FIGS. 3h and 3i) as described hereinafter, and turning on transistor Q1 will apply bias source BA across the anode-cathode paths of SCR's TA, TB, TC to reverse bias them and commutate them off when chopper CH is turned off and they are only conducting low magnitude current. The reactive current paths through feedback diodes DA1, DB1, DC1 and also through feedback diodes DA2, DB2, DC2 are in inverse polarity to the unidirectional power source 10 so that reactive current flow therethrough does not interfere with commutation of SCR's TA, TB, TC. It will be noted that the disclosed arrangement commutates SCR's TA, TB, TC off while transistor chopper CH is turned off and only low magnitude current is flowing therethrough and thus eliminates the conventional means such as auxiliary thyristors and large and expensive commutation inductors and capacitors which are utilized in known force-commutated SCR inverters to commutate off the load current carrying switches.

Transistor switches QA, QB, QC are controlled to provide, in conjunction with the feedback diodes, out-of-phase, low impedance free-wheeling paths for reactive motor current during the off-time of SCR's TA, TB, TC. The transistor switches QA, QB, QC may be driven inexpensively because they have the common emitter potential of the negative bus, and such reactive motor current paths may be easily altered because of the inherent turn-off ability of transistor switches QA, QB, QC.

It will also be noted that this disclosed arrangement eliminates the expensive filter with energy storage required between chopper and inverter bridge of known variable voltage inverters to prevent transient conditions in the inverter bridge from interfering with the unidirectional source. As desribed hereinafter, chopper CH is switched at sufficiently high and constant frequency so that motor M can accomplish the filtering, and elimination of such conventional DC filter improves transient response for the inverter, while the constant high carrier frequency at which chopper CH is switched lowers motor ripple. Further, SCR's TA, TB, TC, are switched at the relatively low fundamental, or motor frequency, and may thus be of inexpensive low-speed type.

A speed controlling potentiometer SP whose winding is connected across a voltage source +12V may be set by the operator to derive an analog command, or speed reference signal whose magnitude is proportional to desired speed of motor M. The command signal is both a speed reference and a voltage reference and controls both the fundamental modulation frequency of inverter INV and the width of PWM pulses which turn chopper CH on and off to vary the average voltage applied to motor M. As a speed reference, the analog command signal is coupled to a voltage controlled oscillator VCO which, in known manner, generates a train of negative-going rectangular, modulation frequency controlling VCO pulses whose frequency is proportional to the magnitude of the analog command signal. The VCO pulses, after inversion in a logic gate G1 (see FIG. 3d), are coupled to a three phase generator 3φ GEN which may in known manner comprise a shift register and in response thereto generates three phase reference square waves A, B, C (see FIGS. 3a, 3b, 3c) displaced 120° apart at a frequency which is 1/6 that of said VCO pulses and which establish the fundamental inverter output frequency. The reference waves A, B, C are associated with and given the same reference designations as the corresponding phase legs of the inverter bridge INV and control the switching of SCR's TA, TB, TC respectively, as described hereinafter, and the leading and trailing edges of the reference waves A, B, C occur in synchronism with the VCO pulses.

The VCO pulses occur at six times modulation frequency (i.e., six times the frequency of reference waves A, B, C) and form commutation signals (FIG. 3d) which turn bias applying transistor Q1 on to connect source BA in reverse polarity to, and thus commutate off, SCR's TA, TB, TC when chopper CH is off during each VCO commutation signal pulse. The VCO pulses are coupled through a bias interface circuit BIC to the base of bias-applying transistor Q1 and turn it on to connect the positive terminal of bias source BA through diodes D1, D2, D3 to the cathodes of SCR's TA, TB, TC and commutate them off.

As a voltage reference the analog command signal is coupled to a voltage boost circuit VB which modifies the command signal to allow selective variation of the volts/hertz curve for low frequency and thus compensate for changes in flux density in motor M with variation in inverter output frequency.

The modified analog command speed signal from VB is applied to a voltage error amplifier VEA that also receives a feedback signal which is a sample of, and proportional to, the average voltage at the motor terminals at, bt, ct. Voltage error amplifier VEA compares the analog signal to the sample voltage feedback signal and derives a unidirectional error signal proportional to their difference. The feedback signal is coupled to voltage error amplifier VEA through a V/f ADJ network which permits selective adjustment of the ratio of feedback voltage to speed reference voltage.

A constant frequency oscillator OSC derives a train of generally triangular sawtooth, or ramp pulses at a relatively high carrier frequency, which may be 1 kilohertz, that establishes the carrier frequency rate of chopping by transistor chopper CH. The constant frequency oscillator OSC also receives the VCO commutation signals as an input to synchronize the chopping frequency to the fundamental output frequency of the inverter by resetting the output of OSC to a predetermined value in response to each VCO pulse. Such phase locking of the 1 kilohertz oscillator and motor frequency assures that chopping is identical in both half cycles of inverter output frequency and thus avoids subharmonics and DC components in the motor current. The error signal from VEA and the train of constant frequency ramp pulses from OSC are inputs to a comparator COMP which compares them and in known manner derives an output train of variable width PWM rectangular pulses whose width is proportional to the magnitude of the error signal.

A chopper PWM logic network CPL receives the VCO commutation signal pulses and the variable width PWM pulses as inputs and superimposes the VCO pulses on the PWM chopper pulses for the purposes of blanking chopper CH during commutation of SCR's TA, TB, TC, i.e. during the commutation interval when the VCO commutation signal pulses turn on bias-applying transistor Q1 to thereby reverse bias and commutate off the SCR's.

The PWM pulses having commutation signal notches superimposed thereon from network CPL (shown in FIG. 3g as "base drive chopper CH") are applied to an inverter logic network INV LOG which also receives as inputs the modulation frequency reference square waves A, B, C and the hig frequency gating pulses from a firing oscillator FO whose output may be at 50 kilohertz. The inverter logic network INV LOG interfaces with the SCR's TA, TB, TC and also with transistor switches QA, QB, QC and combines the three inputs and derives therefrom gating signals for SCR's TA, TB, TC (see FIGS. 3h and 3i) and also derives base drive signals for transisror switches QA, QB, QC (see FIGS. 3e and 3f).

Figure 2:
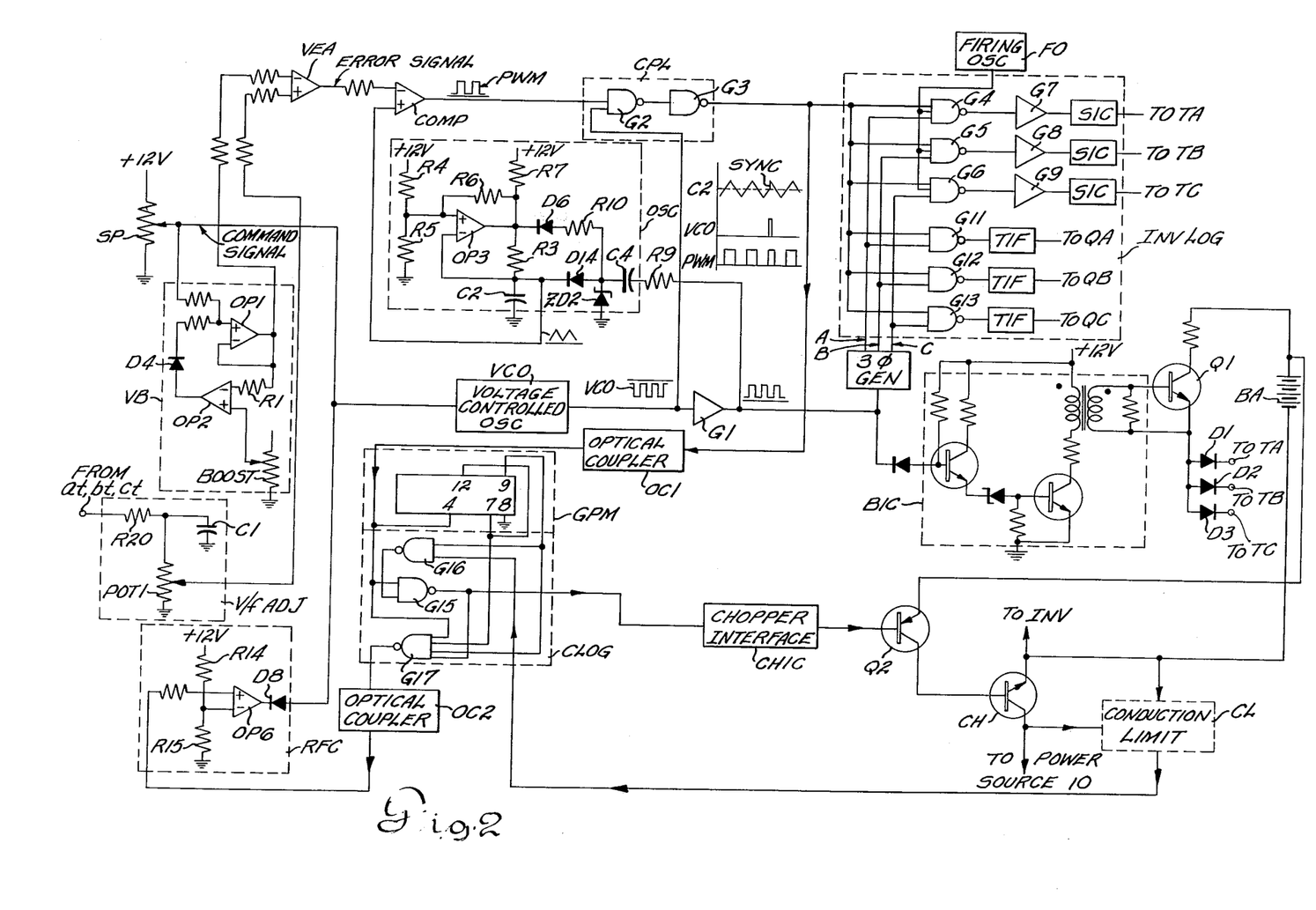
FIG. 2 is a schematic circuit diagram of the control circuit of FIG. 1.
Figure 3:
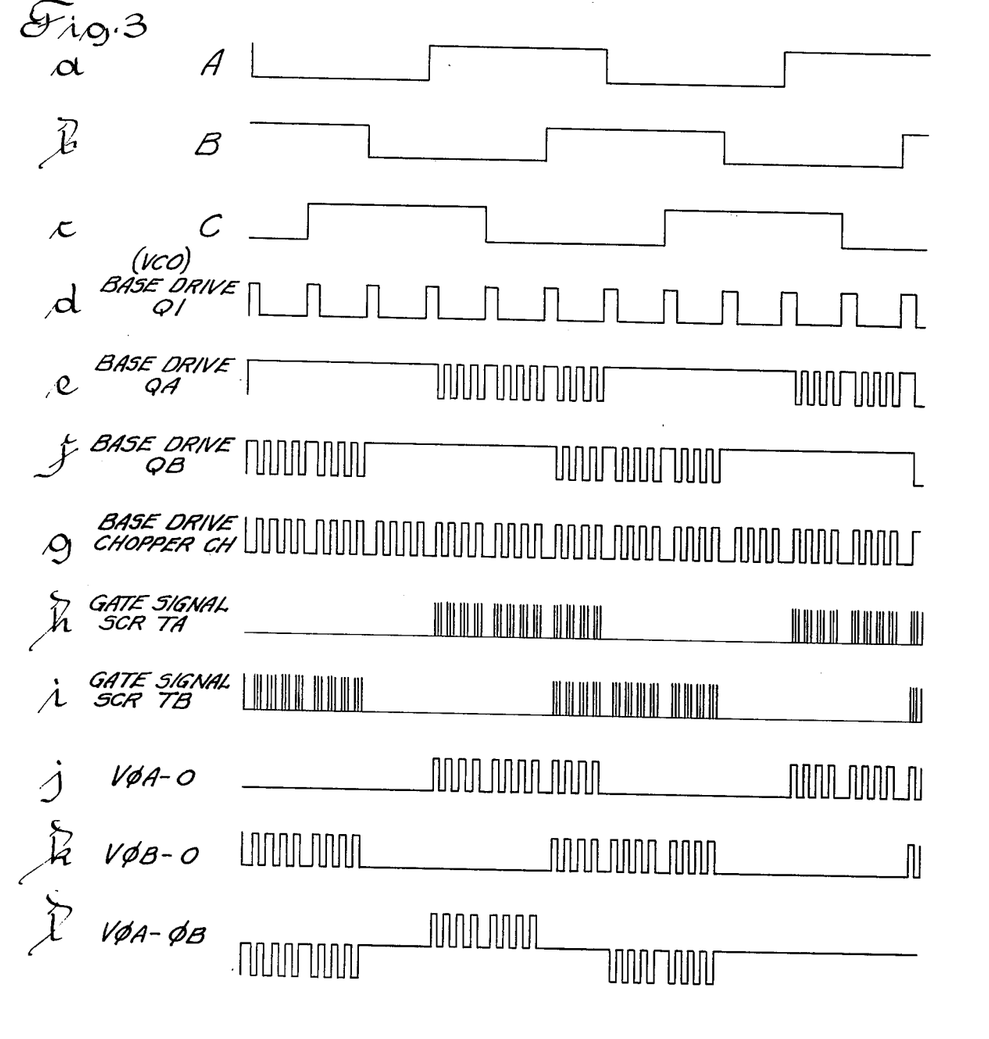
FIGS. 3a–3l show current wave forms at various points within the variable frequency, variable voltage power supply of the invention.

Inverter logic network INV LOG applies 50 kilohertz firing signals to each thyristor TA, TB, TC during the corresponding reference wave A, B, C for the duration of each PWM pulse (which turns on CH) and removes firing signals therefrom during VCO commutation signal pulses and also during the off intervals between the PWM pulses when CH is blanked. For example, gating pulses are applied to SCR TA when chopper CH is on and A is true and are removed when CH is off between PWM pulses and during the VCO pulses. As shown in FIG. 2, network INV LOG includes three 3-input NAND gates G4, G5, G6 whose outputs are respectively coupled through NOT gates G7, G8, G9 to the gates of controlled rectifiers TA, TB, TC. Each gate G4, G5, G6 receives on one input 50 khz firing pulses from FO and on a second input the variable width PWM pulses from gate G3 having commutation notches superimposed thereon. On the third input gates G4, G5, G6 respectively receives reference waves A, B, C from 3ϕ GEN. The output of gate G4 goes to logical 0 when its three inputs are all logical 1, i.e., when (a) gate G3 goes to logical 1 (to turn on CH), and (b) A is true, and (C) FO generates a firing pulse. The resulting logical 0 output of gate G4 is converted to logical 1 by NOT gate G7 whose output is coupled through a suitable SCR interface circuit SIC shown in block form to the gate of TA to fire it. Each thyristor TA, TB, TC is turned off when a commutation signal VCO pulse from gate G1 turns on bias-applying transistor Q1 to apply bias source BA in reverse polarity to the anode-cathode paths of TA, TB, TC to commutate them off (see FIGS. 3h) and 3i). It will thus be appreciated that thyristors TA, TB, TC switch at relatively low frequency and may be of the low-speed type.

It will be appreciated that no expensive commutation components are required for SCR's TA, TB, TC and also that such low-speed SCR's without commutation components are less expensive transistor switches. Further, the interface circuits to SCR's TA, TB, TC are much simpler and less expensive since low-cost transformers may be used rather than the interface circuits for transistors which require high power, continuous, isolated drive signals.

Inverter logic circuit INV LOG also applies base drive turn-on pulses to transistor switches QA, QB, QC during (a) the respective reference waves A, B, C for the duration of the off period between PWM pulses when chopper CH is blanked (see FIGS. 3e and 3f), and (b) during the negation of the corresponding reference wave, e.g., QA is turned on during the $\overline{A}$ reference wave. Gates G11, G13 receive as inputs the corresponding reference waves A, B, C respectively and also receive the positive-going PWM pulses having commutation notches from gate G3. The outputs of G11, G12, G13 are coupled to the bases of transistor switches QA, QB, QC respectively through suitable transistor interface circuits TIF shown in block form. When each reference wave in true, logical 0 from gate G3 in the off-period between positive-going PWM pulses provides logical 1 output from the corresponding gate G11, G12, G13 to turn on the corresponding transistor switch QA, QB, QC (e.g., logical 0 from G3 provides logical 1 from G11 to provide turn-on base drive to QA — see FIG. 3e). Similarly, during the inverstion of each reference wave turn-on base drive is applied to the corresponding transistor switch QA, QB, QC. For exaample, during the $\overline{A}$ wave, the logical 0 input to G11 from 3ϕ GEN will provide a logical 1 output to turn on transistor switch QA. Transistor switches QA, QB, QC thus operate in a manner analogous to an OR gate in that either: (a) they are turned on to provide low impedance, free-wheeling paths for receive motor current when chopper CH is turned off during the corresponding reference wave, or (b) they are turned on when the inversion of the corresponding reference wave is true, e.g., QA is turned on during $\overline{A}$, to provide paths for power pulses to the motor as well as free-wheeling paths.

The transistor switches QA, QB, QC are located in the negative bus where they may be inexpensively driven since they have a common emitter potential and are turned on sequentially for 180° intervals to provide, together with the feedback diodes, low impedance, free-wheeling paths for reactive motor current when thyristors TA, TB, TC are turned off. Such free-wheeling paths may be easily altered because of the inherent turnoff capability of the transistor switches. All three transistor switches QA, QB, QC are turned on when chopper CH is off.

When chopper transistor CH is driven, its emitter may swing between zero volts and 300 volts, and consequently isolation of chopper CH by optical isolator couplers OC1 and OC2 is desirable to drive chopper CH efficiently. It will be appreciated that an inverter with a transistor chopper can operate at the relatively high frequency of oscillator OSC which eliminates the need for an LC filter at the input to the chopper and also provides excellent dynamic response which is usually only characteristic of PWM inverter.

The PWM pulses with commutation signal notches from gate G3 of CPL are coupled through an optical isolator coupler OC1 to a guard pulse monostable multivibrator GPM and also to a chopper logic circuit CLOG which is connected through a chopper interface circuit CHIC (shown in block form) to the base of chopper driver transistor Q2 (shown in skeleton schematic form). The PWM pulses trigger a first monostable multivibrator in GPM to its astable state wherein it holds CLOG in its existing state to prevent turning on chopper CH for a time delay. When the first multivibrator in GPM times out, it triggers CLOG to (a) apply the PWM pulse to chopper driver Q2 to turn on chopper CH, and (b) triggers a second multivibrator in GPM to its astable state to prevent CLOG from responding to the conduction limit circuit (CL) output for the duration of a "guard pulse," thereby assuring that the chopper CH will remain on for the duration of the guard pulse, i.e., for the period of the second multivibrator. The period of the second multivibrator in GPM is less than the time interval that chopper transistor CH can safely remain out of saturation without damage and establishes the width of the guard pulse during which CH is turned on. Chopper transistor CH should saturate during the guard pulse and will conduct during the remainder of the PWM pulse if it does turn on. The collector-to-emitter potential $V_{CE}$ of chopper transistor CH is sensed by conduction limit circuit CL (shown in block form) whose output is coupled to the chopper logic circuit CLOG. If chopper CH does not saturate during the guard pulse, the output of conduction limit circuit CL will actuate chopper logic circuit CLOG to remove the turn-on signal to chopper CH at the end of the guard pulse when the second multivibrator in GPM returns to its stable state, in the manner disclosed in my U.S. Pat. No. 3,855,520 having the same assignee as this invention. Further, if chopper transistor CH pulls out of saturation at any time after the guard pulse, conduction limit circuit CL will sense its increased $V_{CE}$ potential and trigger CLOG to remove the turn-on signal from the chopper. The chopper logic circuit CLOG will also respond to the output of conduction limit circuit CL when the chopper CH is not following the PWM control pulses and, through an optical isolator OC2, trigger a "reduce frequency" circuit RFC whose output is coupled to the input of voltage controlled oscillator VCO and substracts from the magnitude of the analog command signal so that the inverter modulation frequency is reduced. This permits the inverter INV to increase motor speed relatively slowly instead of in a single step.

CONTROL CIRCUIT DETAILS

VOLTAGE BOOST

The analog command signal from potentiometer SP can be selectively modified by voltage boost circuit VB to raise or lower the low frequency portion of the motor terminal voltage versus motor frequency characteristic in a direction to provide a voltage boost at low motor speed and thus compensate for decrease in magnitude of motor current and in motor torque that would occur at low frequencies in the absence of such voltage boost. Circuit VB, in effect, senses when the level of the analog command signal is above or below a predetermined value and adds a voltage to the analog signal at low motor speeds when the analog signal is below such predetermined magitude. The analog command signal is coupled to the noninverting input of an operational amplifier OP1. OP1 merely repeats this analog command signal since it has a feedback loop which gives it a multiplication factor of unity. The output of OP1 is coupled through a resistance R1 to the inverting input of a comparator operational amplifier OP2 which receives on its noninverting input a fixed voltage reference signal from the slider of a BOOST potentiometer. The output of OP2 is coupled through a diode D4 to the noninverting input of OP1. Amplifier OP2 compares its two inputs, and when the analog command signal is less than the fixed reference signal set on the BOOST potentiometer, OP2 adds a voltage to the noninverting input of unity gain amplifier OP1 which brings its output voltage up to the level of the breakpoint in the voltage-frequency characteristic. It will be appreciated that the BOOST potentiometer permits selective variation of the level of the low motor speed portion of the motor terminal voltage versus frequency characteristic.

VOLTAGE REFERENCE

The voltages at motor terminals $at$, $bt$, $ct$ are fed back through diodes D10, D11, D12, which provide an OR function, and through a resistance R20 to the V/f ADJ network comprising an "average" filter including a capacitance C1 to provide a measure of average motor terminal voltage which is impressed across a potentiometer POT 1 having one side grounded. A sample of the average motor terminal voltage available at the slider of POT 1 is applied to the noninverting input of voltage error amplifier VEA which receives on its inverting input the analog command signal is modified by voltage boost circuit VB.

ONE KILOHERTZ OSCILLATOR

One kilohertz oscillator OSC derives generally triangular ramp, or sawtooth pulses across a capacitor C2 which are applied to the noninverting input of comparator amplifier COMP. Oscillator OSC includes an operational amplifier OP3 whose output is coupled through a charging resistance R3 to capacitor C2 and whose inverting input is coupled to C2. The noninverting input of OP3 is coupled to a voltage divider including resistance R4 and R5 connected in series between voltage source +12V and ground. Such voltage divider also includes a positive feedback resistance R6 between the output and noninverting input of OP3 and a resistance R7 connecting one side of R3 to the +12V source.

Capacitor C2 is charged through R3 and R7 from the +12V source until the voltage across C2 is equal to the voltage set on the noninverting input of OP3 by voltage divider R4, R5, R6, R7. OP3 then switches to the low state, and the resulting low output voltage from OP3 is positively fed back through R6 to its noninverting input which assumes a lower potential. C2 then discharges through R3 until the capacitor voltage again equals the potential on the noninverting input of OP3, which now switches to the high state, and the cycles repeats. The voltage across capacitor C2 is a generally triangular ramp signal which is applied to the noninverting input of comparator amplifier COMP.

Each negative-going pulse from voltage controlled amplifier VCO is inverted by a NOT logic gate G1 whose output is a phase synchronizing signal to oscillator OSC and is coupled to capacitor C2 through a differentiating circuit comprising a resistance R9 and a capacitance C4. Each positive-going VCO pulse from gate G1 is converted by differentiating circut C4, R9 to a spike synchronizing pulse SYNC which is coupled through a diode D14 to capacitor C2 and raises the capacitor voltage to the predetermined value which causes OP3 to switch to the low state. Zener diode ZD2 limits the peak magnitude of the spike pulse. This brings the phase of the 1 kilohertz oscillator OSC and the voltage controlled oscillator OSC into synchronism. Such phase locking of VCO and 1 kilohertz pulses avoids beat frequencies between such pulses and assures that chopper CH is reset at the beginning of each cycle of inverter fundamental output frequency, that chopping is identical in both half cycles of inverter fundamental output frequency, and that harmonics and subharmonics are of low magnitude in the motor current.

Inverters embodying the invention having means to synchronize chopping frequency to modulation frequency are also disclosed in my copending application Ser. No. 744,133 filed Nov. 22, 1976 and in copending application in the names of F. A. Stich and T. P. Gilmore, Ser. No. 735,609 filed Oct. 26, 1976 both having the same assignee as this invention.

COMPARATOR AMPLIFIER

Comparator operational amplifier COMP receives the unidirectional analog error signal on its inverting input and the 1 kilohertz ramp pulses on its noninverting input. COMP compares the two inputs and changes to the high state to derive in known manner the leading edge of a variable width PWM pulse when the leading edge of the ramp signal exceeds the error signal, and it forms the trailing edge of the PWM pulse when the ramp signal trailing edge again crosses the level of the error signal.

CHOPPER PWM LOGIC

The chopper PWM logic CPL includes a NAND logic gate G2 which receives as inputs the variable width positive-going PWM pulses from COMP and the negative-going VCO commutation signal pulses and superimposes commutation notches on the PWM pulses.

CHOPPER INTERFACE

The positive-going PWM pulses from gate G3 are applied through optical oscillator OC1 to (a) one input of a NAND logic gate G15 of circuit CLOG, and (b) input pin 4 of guard pulse monostable multivibrator GPM shown as an integrated circuit such as the type MC-14528 commercially available from Motorola Corporation and embodying two monostable multi- vibrators, Gate G15 does not change its logical 1 output at this time since it has a logical 0 on its other input from a gate G16 (which is receiving logical 1 inputs from pin 9 of GPM and from the conduction limit circuit CL). The logical 1 PWM pulse from G3 triggers the first GPM multivibrator to the astable state so that is provides logical 0 on its $\overline{Q}$ output pin 7 which is coupled to input pin 12 of the second monostable multivibrator, thereby holding $\overline{Q}$ output pin 9 of the second multivibrator at logical 1 for the period of the first multivibrator, preventing change of gate G16, and delaying the turning on of the chopper CH for the period of the first multivibrator.

Pin 7 goes to logical 1 when the first multivibrator times out, thereby applying logical 1 to pin 12 to trigger the second multivibrator to its astable state and provide logical 0 on the $\overline{Q}$ output pin 9. Logical 0 on pin 9 converts the output of gate G16 to logical 1 which changes the output of gate G15 to logical 0 to turn on chopper driver transistor Q2 which then conducts to apply forward bias from the positive terminal of source BA to the base of chopper transistor CH.

The chopper interface circuit CHIC is shown only in block form and the separate voltage source BA referenced to the emitter of CH is illustrated as a battery.

The period of the second multivibrator in GPM establishes the width of the "guard pulse" during which chopper transistor CH should turn on at the beginning of each PWM pulse. The logical 0 on pin 9 of GPM holds the output of gate G15 at logical 0 so that chopper logic CLOG cannot respond to the conduction circuit as long as the second monostable is in the astable state. The "guard pulse" period of the second multivibrator in GPM is shorter than the time interval chopper transistor CH can safely be out of saturation without damage. Chopper transistor CH should saturate and provide logical 0 output from conduction limit circuit CL during the guard pulse period of the second monostable multivibrator in GPM, and if CH does go into saturation, the logical 0 from CL will prevent change of the logical 1 output from gate G15 when the second multivibrator in GPM times out. However, if chopper transistor CH pulls out of saturation during the guard pulse, conduction limit circuit CL will provide a logic 1 output to gate G16, in the manner disclosed in my U.S. Pat. No. 3,855,520, to convert its output to logical 0 when the second multivibrator times out and provides logical 1 on pin 9, thereby converting the output of G15 to logical 1 to turn off the chopper.

If chopper transistor CH pulls out of saturation at any time after the guard pulse, conduction limit circuit CL will provide logical 1 output to logic gate G16, thereby changing its output to logical 0. The logical 0 from gate G16 will provide logical 1 output from gate G15 to turn off the chopper. The logical 1 from gate G15 will also provide a logical 0 output from 4-input NAND gate G17 which is coupled through optical coupler OC2 to the noninverting input of an operational amplifier OP6 in the reduce frequency circuit RFC and switches it to the low state. Amplifier OP6 receives a positive voltage on its inverting input from a voltage divider R14, R15, ad the output of OP6 is coupled through a diode D8 to the input of oscillator VCO. When OP6 switches to the low state, diode D8 conducts and substracts from the analog command signal input to oscillator VCO and thereby causes oscillator VCO to reduce the frequency of its modulation frequency controlling pulses. This reduces motor frequency and permits inverter INV to increase motor speed slowly instead of in a single step or to reduce speed in the event of a sudden increase in shaft load.

CONDUCTION LIMIT

Conduction limit circuit CL is coupled to chopper logic circuit CLOG and provides a logical 0 signal thereto when chopper CH is in saturation and a logical 1 signal at all other times. Stated in another manner, the output of conduction limit circiur CL follows the $V_{CE}$ voltage of chopper CH and is logical 0 and logical 1 respectively when transistor CH is respectively in and out of saturation.

Conduction limit circuit CL for chopper CH protects SCR's TA, TB, TC and also transistor switches QA, QB, QC since limiting the current that chopper CH can carry also limits the current that the SCR's and transistor switches can carry.

It will be appreciated that the disclosed inverter arrangement provides high frequency-PWM, variable magnitude voltage to a motor load using only a single chopper switch whose carrier frequency is sifficiently high so that the motor can do the filtering and no DC filter is required for the chopper.

FIGS. 3j and 3k illustrate the fundamental frequency phase-to-neutral voltages for inverter phases A and B respectively and FIG. 3l shows the resultant phase-to-phase voltage having positive and negative half cycles.

While only a single embodiment of my invention has been illustrated and described, many modifications and variations thereof will be readily apparent to those skilled in the art, and consequently it should be understood that I do not intend to be limited to the particular embodiment shown and described.

The embodiments of the invention in which an exclusive property or privilege is claimed are defined as follows:

1. An inverter for supplying variable frequency and variable magnitude voltage to a load including a voltage-controlling chopper transistor coupled in series respectively with at least a first and second load current carrying controlled rectifier across the positive and negative polarities of said source, means for time ratio controlling said chopper transistor as a function of the magnitude of an analog command signal, means for modulating said controlled rectifiers at a frequency which is a function of the magnitude of said analog command signal to establish inverter output frequency, and commutation means for intermittently applying reverse bias voltage to said controlled rectifiers to commutate them off while said transistor chopper is turned off.

2. An inverter in accordance with claim 1 wherein said means for modulating said controlled rectifiers includes means for deriving a train of modulation frequency controlling pulses whose frequency is a function of the magnitude of said analog command signal, and wherein said commutation means is responsive to said modulation frequency controlling pulses to commutate said controlled rectifiers off and said time ratio controlling means is responsive to said modulation frequency controlling pulses to turn off said chopper transistor.

3. An inverter in accordance with claim 2 wherein said time ration controlling means includes a constant frequency oscillator and modulates said chopper transistor at said constant oscillator frequency, and said inverter includes synchronizing means for setting the output of said constant frequency oscillator to a predetermined value in response to said modulation frequency controlling pulses to synchronize chopping frequency to inverter output frequency.

4. An inverter in accordance with claim 3 wherein said constant frequency oscillator derives a train of generally triangular pulses and the signals for modulating said chopper transistor result from the interaction of said triangular pulses and a steady state signal whose magnitude is a function of said analog command signal.

5. An inverter in accordance with claim 4 wherein said inverter has $n$ legs each of which includes one of said load current carrying controlled rectifiers coupled in series with said chopper transistor across said unidirectional source, and said means for modulating said controlled rectifiers includes a generator for deriving $n$ reference waves displaced $360/n$ electrical degrees apart which are synchronized to said modulation frequency controlling pulses and each of which is associated with one leg of said inverter and controls the modulation of the controlled rectifier in the associated inverter leg.

6. An inverter in accordance with claim 1 and including a bias potential source referenced to the output of said chopper transistor, said commutation means includes bias-applying transistor means for coupling the other terminal of said bias potential source to said controlled rectifiers to reverse bias the anode-cathode paths thereof and commutate them off, and said time ratio controlling means includes a base drive transistor for coupling said other terminal of said bias potential source to the base of chopper transistor to forward bias it into conduction.

7. An inverter in accordance with claim 6 wherein said means for modulating said controlled rectifiers includes a voltage controlled oscillator for deriving a train of modulation frequency controlling pulses whose frequency is a function of the magnitude of said analog command signal, and said commutation means turns on said bias-applying transistor means in response to said modulation frequency controlling pulses and said time ratio controlling means turns off said base drive transistor in reponse to said modulation frequency controlling pulses.

8. An inverter in accordance with claim 1 wherein said inverter has $n$ legs with one of said load current carrying controlled rectifiers connected in series with the emitter-collector path of a transistor switch in each leg at the output of said chopper transistor and with the junction between said controlled rectifier and said transistor switch adapted to be coupled to said load.

9. An inverter in accordance with claim 8 wherein said commutation means includes a bias potential source having one terminal referenced to the output of said chopper transistor, bias-applying transistor means for coupling the other terminal of said bias potential source to said junctions between said controlled rectifiers and said transistor switches in said $n$ legs to reverse bias said controlled rectifiers and commutate them off, and means for intermittently turning on said bias-applying transistor means when said chopper transistor is turned off.

10. An inverter in accordance with claim 9 wherein said time ratio controlling means includes a base drive transistor for coupling said other terminal of said bias potential source to the base of said chopper transistor to forward bias it into conduction.

11. An inverter in accordance with claim 9 wherein said time ratio controlling means includes a constant frequency oscillator and modulates said chopper transistor at the constant frequency of said oscillator, and said inverter also includes means for synchronizing the switching of said chopper transistor to the modulation of said controlled rectifiers so that chopping is similar in the positive and negative half cycles of the inverter output waves.

12. An inverter in accordance with claim 11 wherein said means for modulating said controlled rectifiers includes voltage controlled oscillator means for deriving a train of modulation frequency controlling pulses whose frequency is a function of the magnitude of said analog command signal, said constant frequency oscillator generates a train of generally triangular pulses, and said means for synchronizing is responsive to said modulation frequency controlling pulses to reset the output of said constant frequency oscillator to a predetermined value.

13. An inverter in accordance with claim 12 wherein the signals for time ratio controlling said chopper transistor result from the interaction of said ramp pulses and a steady state signal whose magnitude is a function of said analog command signal, and wherein said means for modulating said controlled rectifiers includes means for generating a plurality of reference waves which are synchronized to said modulation frequency controlling pulses and each of which is associated with one leg of said inverter and regulates the switching of the controlled rectifier therein.

14. An inverter in accordance with claim 12 wherein said means for intermittently turning on said bias-applying transistor means is responsive to said modulation frequency controlling pulses to commutate off said controlled rectifiers, and said time ratio controlling means is responsive to said modulation frequency controlling pulses to turn off said chopper transistor.

15. An inverter in accordance with claim 14 wherein said means for modulating said controlled rectifiers applies gating pulses to the controlled rectifier in each said leg when said chopper transistor is turned on during the associated reference wave.

16. An inverter in accordance with claim 15 and including means for turning on said transistor switch in each said leg which said chopper transistor is turned off during the associated reference wave and also during the inversion of the associated reference wave.

17. A bridge inverter for supplying variable frequency and variable magnitude voltage from a unidirectional source to a load and comprising $n$ legs coupled across the positive and negative polarities of said source with each leg having a load current carrying controlled rectifier in series with the emitter-collector path of a transistor switch and the junction therebetween adapted to be connected to said load, and a chopper transistor having its emitter-collector path between said source and said legs in the one polarity of said source to which said controlled rectifiers are coupled.

18. A bridge inverter in accordance with claim 15 and including $n$ feedback diodes each of which is connected in inverse polarity shunt relationship to said emitter-collector path of said transistor switch in one leg of said inverter bridge.

19. A bridge inverter in accordance with claim 18 and including $n$ feedback diodes each of which is connected in inverse polarity shunt relation to said controlled rectifier in one leg of said bridge between said junction and said one polarity of said source at the input to said chopper transistor.

20. A bridge inverter in accordance with claim 17 wherein said chopper transistor is coupled to said positive polarity of said source and the emitters of said transistor switches in said $n$ legs are commoned and coupled to said negative polarity of said source.

21. A bridge inverter in accordance with claim 18 and including means for time ratio controlling said chopper transistor as a function of an analog command signal,
a bias potential source, and
commutation means for intermittently applying said bias source in opposite polarity to the anode-cathode path of said controlled rectifier in said $n$ legs to commutate them off when said chopper transistor is turned off.

22. A bridge inverter in accordance with claim 21 wherein said time ratio controlling means includes a base drive transistor arranged to couple said bias potential source to the base of said chopper transistor to forward bias it into conduction.

23. A bridge inverter in accordance with claim 21 and including means for modulating said controlled rectifiers in said $n$ legs at a frequency which is a function of the magnitude of said analog command signal to establish the inverter output frequency.

24. A bridge inverter in accordance with claim 23 wherein said modulating means includes voltage controlled oscillator means for deriving a train of modulation frequency controlling pulses whose frequency is a function of the magnitude of said analog command signal, and a generator for deriving n reference waves displaced $360/n$ electrical degrees apart which are synchronized to said modulation frequency controlling pulses and each of which is associated with and controls the switching of said controlled rectifier in one leg of said bridge inverter.

25. A bridge inverter in accordance with claim 24 wherein said time ratio controlling means includes
a constant frequency oscillator for deriving a train of generally triangular ramp pulses,
comparator means for comparing said ramp pulses to a steady state signal whose magnitude is a function of said analog command signal and for deriving constant frequency variable width pulses which are a function of their difference, and
means for modulating said chopper transistor so that it is turned on during said variable width pulses and is turned off in the intervals between said variable width pulses and also during said modulation frequency controlling pulses.

26. A bridge inverter in accordance with claim 25 and including means for deriving a feedback signal which is an average of the voltages at said junctions between said controlled rectifiers and said transistor switches in said $n$ legs, and
means for comparing said feedback signal to said analog command signal and for deriving a unidirectional error signal whose magnitude is a function of their difference, said error signal constituting said steady state signal to which said comparator means compares said ramp pulses to derive said variable width pulses.

27. A bridge inverter in accordance with claim 25 wherein said commutation means is responsive to said modulation frequency controlling pulses to apply said bias potential source in reverse polarity to said controlled rectifiers in said $n$ legs.

28. A bridge inverter in accordance with claim 27 and including logic network means receiving said reference waves as inputs for applying gating signals to said controlled rectifiers in said respective legs during the associated reference waves when said chopper transistor is turned on by said variable width pulses and for applying base drive to turn on said transistor switches in the respective legs when said chopper transistor is turned off during the associated reference waves.

29. A bridge inverter in accordance with claim 28 wherein said logic network means also applies base drive to turn on the transistor switches in the respective legs during the inversions of the associated reference waves.

30. A bridge inverter in accordance with claim 25 and including means for synchronizing said ramp pulses to said reference waves so that said chopper transistor is reset at the beginning of each half cycle of inverter output frequency and chopping is identical in both half cycles.

31. A bridge inverter in accordance with claim 30 wherein said synchronizing means is responsive to said modulation frequency controlling pulses to set the output of said constant frequency oscillator to a predetermined value.

32. A polyphase series inverter for supplying variable frequency and variable magnitude voltage from a unidirectional power source to a polyphase load comprising $n$ phase legs bridged across the positive and negative polarities of said source with each said phase leg comprising the series arrangement of a controlled rectifier and the emitter-collector path of a transistor switch and with the junction therebetween adapted to be connected to a phase of the load, a chopper transistor having its emitter-collector path between said source and said $n$ phase legs in one polarity of said source, $n$ feedback diodes each of which is in inverse polarity shunt relationship with one of said transistor switches, a bias potential source, and commutation means for intermittently applying said bias potential source in opposite polarity to the anode-cathode paths of said controlled rectifiers in said $n$ phase legs to commutate them off when said chopper transistor is turned off.

33. A polyphase inverter in accordance with claim 32 and including
  means for sequentially applying gating pulses to the respective controlled rectifiers of said $n$ phase legs at a frequency proportional to the magnitude of an analog command signal to establish the inverter output frequency, and
  means for time ratio controlling said chopper transistor as a function of the magnitude of said analog command signal.

34. A polyphase inverter in accordance with claim 33 wherein said gating pulse applying means applies gating pulses sequentially to the respective controlled rectifiers of said n phase legs for intervals of $360/n$ electrical degrees of each inverter output frequency cycle during the periods when said chopper transistor is turned on.

35. A polyphase inverter in accordance with claim 33 wherein the emitters of said transistor switches in said $n$ phase legs are commoned and coupled to the other polarity of said source, and including $n$ feedback diodes each of which is in inverse polarity shunt relation with a controlled rectifier in one phase leg and connected between said junction and the input to said chopper transistor.

36. A polyphase inverter in accordance with claim 33 and including means for applying base drive turn-on signals to said transistor switch of each said phase leg during the intervals that said chopper transistor is turned off while the controlled rectifier of said phase leg is receiving gating pulses.

37. A polyphase inverter in accordance with claim 36 wherein said base drive turn-on signal applying means also applies said turn-on signals to said transistor switch of each said phase leg during the intervals when the controlled rectifier of said phase leg is not receiving gating pulses.

38. A polyphase inverter in accordance with claim 33 wherein said means for sequentially applying gating pulses includes a voltage controlled oscillator for deriving a train of modulation frequency controlling pulses whose frequency is a function of the magnitude of said analog command signal, and means for generating n phase reference waves displaced $360/n$ electrical degrees apart which are synchronized to said modulation frequency controlling pulses and each of which is associated with one inverter phase leg and controls the gating of the controlled rectifier thereof, and wherein said commutation means is responsive to said modulation frequency controlling pulses to commutate off said controlled rectifiers in said $n$ phase legs.

39. A polyphase inverter in accordance with claim 36 wherein said time ratio controlling means includes a constant frequency oscillator for deriving a train of generally triangular pulses, means for comparing said triangular pulses to a steady state signal whose magnitude is a function of said analog command signal to derive constant frequency variable width pulses, and means for superimposing said modulation frequency controlling pulses on said variable width constant frequency pulses, said chopper transistor being modulated in accordance with the output of said superimposing means so that it is turned on during said variable width pulses and turned off in the intervals between said pulses and also during said modulation frequency controlling pulses.

40. A polyphase inverter in accordance with claim 39 and including logic network means receiving as inputs said phase reference waves and the output of said superimposing means for applying gating pulses to the controlled rectifiers in the respective inverter phase legs whenever said chopper transistor is turned on by a variable width pulse during the associated phase reference wave.

41. A polyphase inverter in accordance with claim 40 wherein said logic network means applies base drive to turn on said transistor switches in the respective phase legs whenever said chopper transistor is turned off during the associated phase reference wave and also during the inversion of the associated phase reference wave.

42. A polyphase inverter in accordance with claim 39 and including means for deriving a feedback signal which is a sample of the average voltages at said junctions between said controlled rectifiers and said transistor switches in said $n$ phase legs, means for comparing said feedback signal to said analog speed reference signal and for deriving a unidirectional error signal whose magnitude is a function of their difference, said error signal constituting said steady state signal to which said triangular pulses are compared to derive said variable width pulses.

43. A polyphase inverter in accordance with claim 39 wherein said time ratio controlling means includes chopper logic means receiving as an input the output from said superimposing means for turning off said chopper transistor in response to each said modulation frequency controlling pulse and for turning on said chopper transistor after a time delay in response to said variable width pulses.

44. A polyphase inverter in accordance with claim 43 and including sensor means for deriving a conduction limit signal when the collector-to-emitter voltage of said chopper transistor exceeds a predetermined value, said chopper logic means being responsive to said conduction limit signal to turn off said chopper transistor.

45. A polyphase inverter in accordance with claim 44 and including modulation frequency reducing means operable to decrease the magnitude of said analog command signal and thereby diminish the frequency of said modulation frequency controlling pulses, and wherein said chopper logic means is responsive to said conduction limit signal to trigger said modulation frequency reducing means.

46. A polyphase inverter in accordance with claim 44 wherein said chopper logic means includes a monostable multivibrator which is triggered to its astable state in response to said variable width pulses, and wherein said chopper logic means is nonresponsive to said conduction limit signal while said monostable mulitvibrator is in said astable state, whereby said chopper transistor may saturate during the period of said monostable mulitvibrator.

47. A polyphase inverter in accordance with claim 38 wherein said phase reference wave generating means derives waves whose leading edges are controlled by said modulation frequency controlling pulses, and including synchronizing means for setting the output of said constant frequency oscillator to a predetermined magnitude in response to said modulation frequency controlling pulses so that said chopper is reset at the leading edge of said reference waves and chopping is identical in both half cycles of inverter output frequency.

48. An inverter for supplying variable frequency and variable magnitude voltage from a unidirectional source to a load and having a chopper transistor coupled in series respectively with n legs, each of which includes a load current carrying controlled rectifier, across the positive and negative polarities of said source, means for modulating said controlled rectifiers at a frequency which is a function of an analog command signal and including voltage controlled oscillator means for deriving a train of modulation frequency controlling pulses at a frequency which is a function of the magnitude of said analog command signal and a generator for deriving n reference waves displaced 360/n elecrical degrees apart which are synchronized to said modulation frequency controlling pulses and each of which is associated with one of said inverter legs and controls the gating of the controlled rectifier therein, means for time ratio controlling said chopper transistor as a function of the magnitude of said analog command signal and being responsive to said modulation frequency controlling pulses to turn off said chopper transistor, and commutation means for applying reverse bias to the anode-cathode paths of said controlled rectifiers in response to said modulation frequency controlling pulses to commutate them off.

49. An inverter in accordance with claim 48 wherein said time ratio controlling means includes a constant frequency oscillator for deriving a train of triangular pulses, and means for comparing said constant frequency triangular pulses to a steady state signal whose magnitude is a function of said analog command signal to derive variable width pulses for modulating said chopper transistor.

50. An inverter in accordance with claim 49 and including means responsive to said modulation frequency controlling pulses for setting the output of said constant frequency oscillator to a predetermined value to synchronize said chopper transistor to the inverter output frequency.

51. An inverter in accordance with claim 48 wherein said commutation means includes a bias potential source referenced to the output of said chopper transistor, and bias-applying transistor means responsive to said modulation frequency controlling pulses for coupling the other terminal of said bias potential source to said controlled rectifiers to reverse bias the anode-cathode paths thereof and commutate them off.

* * * * *

UNITED STATES PATENT OFFICE
CERTIFICATE OF CORRECTION

Patent No. 4,048,554         Dated  September 13, 1977

Inventor(s) Frederick A. Stich

It is certified that error appears in the above-identified patent and that said Letters Patent are hereby corrected as shown below:

Claim 1, line 4, "a" should be inserted after --- and ---;

Claim 3, line 2, "ration" should read --- ratio ---; and

Claim 46, lines 6 and 9, "mulitvibrator" should read --- multivibrator --- .

Signed and Sealed this

Thirty-first Day of January 1978

[SEAL]

Attest:

RUTH C. MASON
Attesting Officer

LUTRELLE F. PARKER
Acting Commissioner of Patents and Trademarks